United States Patent
Mizutani et al.

(10) Patent No.: US 6,787,202 B2
(45) Date of Patent: Sep. 7, 2004

(54) POLYESTER FILM COMPOSITE, LIGHT-DIFFUSER PLATE AND UTILIZATION THEREOF

(75) Inventors: Kei Mizutani, Sagamihara (JP); Takashi Saigo, Gifu (JP); Masayuki Fukuda, Sagamihara (JP)

(73) Assignee: Teijin Limited, Osaka (JP)

( * ) Notice: Subject to any disclaimer, the term of this patent is extended or adjusted under 35 U.S.C. 154(b) by 151 days.

(21) Appl. No.: 09/958,276
(22) PCT Filed: Feb. 9, 2001
(86) PCT No.: PCT/JP01/00951
§ 371 (c)(1),
(2), (4) Date: Oct. 9, 2001
(87) PCT Pub. No.: WO01/58991
PCT Pub. Date: Aug. 16, 2001

(65) Prior Publication Data
US 2003/0017281 A1 Jan. 23, 2003

(30) Foreign Application Priority Data
Feb. 10, 2000 (JP) .......................... 2000-033189
Mar. 3, 2000 (JP) .......................... 2000-058589
Jul. 12, 2000 (JP) .......................... 2000-211155

(51) Int. Cl.$^7$ .................... B32B 27/08; B32B 27/36
(52) U.S. Cl. ............... 428/1.54; 428/1.3; 428/1.33; 428/331; 428/343; 428/480; 428/910; 359/601; 524/493
(58) Field of Search ................... 428/1.3, 1.33, 428/1.54, 331, 401–402, 217, 343, 480, 910; 359/601, 614; 524/409, 445, 492–493

(56) References Cited

U.S. PATENT DOCUMENTS 3,515,626 A * 6/1970 Duffield ..................... 428/325
5,610,001 A * 3/1997 Mostaert et al. ............ 430/533
5,910,356 A * 6/1999 Ishikawa et al. ............ 428/215
6,589,649 B2 * 7/2003 Oya et al. ................... 428/343

FOREIGN PATENT DOCUMENTS

| EP | 0882575 A1 | 12/1986 |
| EP | 0435080 A1 | 7/1991 |
| EP | 0669359 A1 | 8/1995 |
| EP | 0728801 A2 | 8/1996 |
| EP | 0764708 A2 | 3/1997 |
| EP | 0789051 A2 | 8/1997 |
| EP | 0794527 A2 | 9/1997 |
| EP | 0951991 A1 | 10/1999 |
| EP | 0962486 A2 | 12/1999 |
| JP | 59-232857 A | 12/1984 |
| JP | 3-17135 A | 1/1991 |
| JP | 5-202215 A | 8/1993 |

(List continued on next page.)

OTHER PUBLICATIONS

Merriam–Webster's Collegiate Dictionary, Tenth Edition, 1993, p. 320.*

(List continued on next page.)

Primary Examiner—Harold Pyon
Assistant Examiner—Sow-Fun Hon
(74) Attorney, Agent, or Firm—Sughrue Mion, PLLC

(57) ABSTRACT

A polyester film composite material comprising a biaxially oriented polyester film having a thickness of 5 at least 50 gm but not more than 200 gm and an easy-adhesion coating applied onto one or each surface thereof, and having a haze value of less than 2% and a total light transmissivity of at least 90%, and a light-diffusing plate comprising a light-diffusing layer 10 laminated on the surface of the easy-adhesion coating thereof. According to the present invention, a light-diffusing plate having excellent optical properties when used in a liquid crystal display and a substrate 15 therefor are provided.

22 Claims, 1 Drawing Sheet

FOREIGN PATENT DOCUMENTS

| JP | 6-136166 A | 5/1994 |
|---|---|---|
| JP | 07145255 | 6/1995 |
| JP | 7-145255 A | 6/1995 |
| JP | 09254325 | 9/1997 |
| JP | 9-254325 A | 9/1997 |
| JP | 11-30708 A | 2/1999 |
| JP | 11-125926 A | 5/1999 |
| JP | 11-216825 A | 8/1999 |
| JP | 11-262989 A | 9/1999 |
| JP | 11-300899 A | 11/1999 |
| JP | 2000344875 | 12/2000 |
| JP | 2001272508 | 10/2001 |
| JP | 2001281423 | 10/2001 |
| JP | 2002127341 | 5/2002 |

OTHER PUBLICATIONS

Patent Abstracts of Japan, JP–A–11–30708, DATE Feb. 2, 1999.

Patent Abstracts of Japan, JP–A–11–300899, DATE Nov. 2, 1999.

Patent Abstracts of Japan, JP–A–11–262989, DATE Sep. 28, 1999.

Patent Abstracts of Japan, JP–A–7–145255, DATE Jun. 6, 1995.

Patent Abstracts of Japan, JP–A–9–254325, DATE Sep. 30, 1997.

Patent Abstracts of Japan, JP–A–11–216825, DATE Aug. 10, 1999.

Patent Abstracts of Japan, JP–A–11–125926, DATE May 11, 1999.

Patent Abstracts of Japan, JP–A–6–136166, DATE May 17, 1994.

Patent Abstracts of Japan, JP–A–5–202215, DATE Aug. 10, 1993.

Patent Abstracts of Japan, JP–A–3–17135, DATE Jan. 25, 1991.

Derwent Abstract of JP–A–59–232857, DATE Dec. 27, 1984.

* cited by examiner

F I G. 1
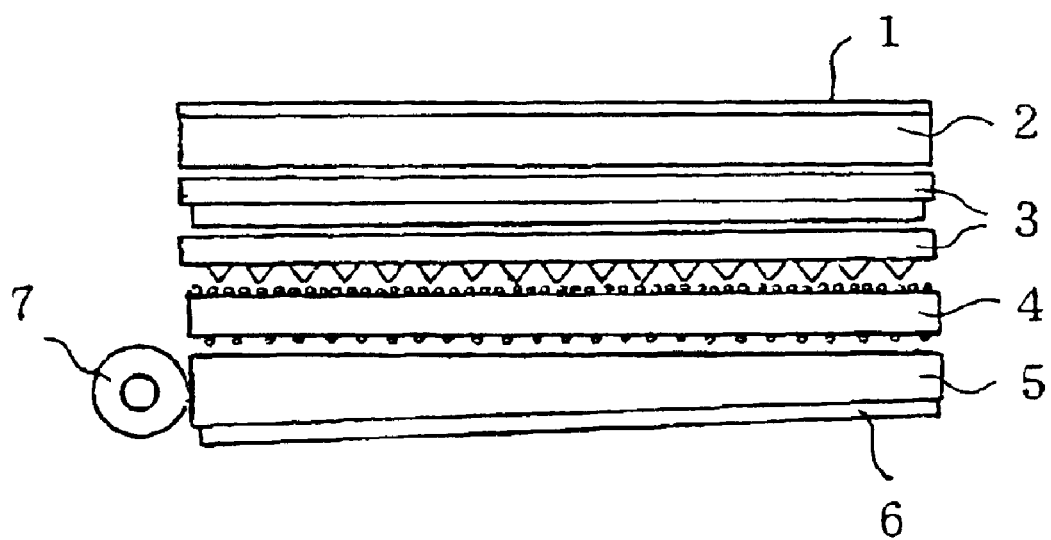

POLYESTER FILM COMPOSITE, LIGHT-DIFFUSER PLATE AND UTILIZATION THEREOF

This application is a national stage entry of PCT/JP01/00951 filed Feb. 9, 2001.

BACKGROUND OF THE INVENTION

Field of the Invention

The present invention relates to a polyester film composite material. More specifically, it relates to a polyester film composite material having a high brilliance and excellent light-scattering properties and having excellent properties as a substrate for a light-diffusing plate of a backlight unit for a liquid crystal display, particularly a liquid crystal display for a personal computer, and use thereof.

In recent years, personal computers are rapidly coming into wide use, and, particularly, portable note personal computers and space-saving desktop personal computers are remarkably spreading. A demand for liquid crystal displays is increasing, and attempts are being made to employ larger-screens. The light-diffusing plate constituting a backlight unit of a liquid crystal display therefore comes to be newly required to satisfy a variety of properties as well.

BRIEF DESCRIPTION OF DRAWINGS

FIG. 1 is a conceptual view of constitution of a light-diffusing plate having a polyester film composite material of the present invention and a light-diffusing layer laminated thereon and a liquid crystal display having the light-diffusing plate arranged therein. In FIG. 1, each member and each symbol are as follows. For explanation of the drawing, members are shown as separate ones, and in an actual constitution, the members are in an intimate contact.

1 . . . Protective glass
2 . . . Liquid crystal panel
3 . . . Lens sheet
4 . . . Light-diffusing plate
5 . . . Light-guiding plate
6 . . . White film
7 . . . Cold cathode tube (1.6 W)

A backlight liquid crystal display has a structure, for example, as shown in the above-referred FIG. 1, that is, a structure in which a light-guiding plate 5, a light-diffusing plate 4, a lens sheet 3, a liquid crystal panel 2 and a protective glass plate 1 are consecutively laminated on a white film 6. Of these, a unit in which the light-guiding plate 5 and the light-diffusing plate 4 are laminated on the white film 6 so as to introduce light into the light-guiding plate 5 from a light source 7 refers to a backlight unit. In FIG. 1, light introduced into the light-guiding plate 5 from the light source (cold cathode tube) 7 is scattered through the light-diffusing plate 4, is condensed through the lens sheet 3 and then led to the liquid crystal panel 2 to display information corresponding to a signal provided to the liquid crystal panel 2 through the protective glass plate 1.

BACKGROUND ART

When a sticking (partial adhesion) takes place between the light-guiding plate 5 and the light-diffusing plate 4 in the above backlight unit, light is transmitted through such a portion without being fully diffused, so that non-uniformity takes place in brilliance of the entire screen of a liquid crystal display. The above problem is liable to take place as the screen increases in size. As one means for overcoming the above problem, JP-A-11-30708 proposes that when a sheet is extruded, the sheet should be taken up with a polishing roll whose surface has a number of convex portions, thereby to form a number of semi-spherical protrusions on the reverse-surface side (light-source side) of the light-diffusing plate (sheet). Further, the above Publication also presents a method of embossing the reverse surface of a light-diffusing sheet and a method of applying a coating solution containing beads, as prior art, together with problems thereof.

As a result of studies made by the present inventors, it has been found that, when a light-diffusing plate having a biaxially oriented polyester film as a base film and having a light-diffusing layer formed on one surface is produced, it is required to improve the film in adhesion to the light-diffusing layer for allowing the light-diffusing plate to fully exhibit its function. Further, while the above backlight unit is desirably a unit that forms a liquid crystal screen having a high brilliance with a smaller light source, it has been found that it is required to further increase the light transmissivity of the biaxially oriented polyester film for that purpose.

BRIEF SUMMARY OF THE INVENTION

It is an object of the present invention to provide a biaxially oriented polyester film composite material in which a biaxially oriented polyester film is imparted with superior light transmissivity while maintaining a proccessability and capability of easy adhesion to the light-diffusing layer, particularly to a layer containing resin beads, and which is useful as a base film for a light-diffusing plate. Further, it is another object of the present invention to provide a light-diffusing plate excellent in light transparency, light diffusibility and brilliance.

DETAILED DESCRIPTION OF THE INVENTION

According to the studies made by the present inventors, the above objects of the present invention are achieved by a polyester film composite material comprising a biaxially oriented polyester film having a thickness of at least 50 $\mu$m but not more than 200 $\mu$m and an easy-adhesion coating applied onto one or each surface thereof, and having a haze value of less than 2% and a total light transmissivity of at least 90%.

According to the present invention, further, there is provided a light-diffusing plate having the above polyester film composite material and a light-diffusing layer laminated on the easy-adhesion coating surface thereof.

The present invention will be explained further in detail hereinafter.

The polyester for constituting the polyester film composite material of the present invention is preferably polyethylene terephthalate or polyethylene-2,6-naphthalate, particularly preferably polyethylene terephthalate. The polyethylene terephthalate and the polyethylene-2,6-naphthalate may be a homopolymer or a copolymer formed by copolymerizing a third component so long as their basic properties are not impaired, while a homopolymer is preferred.

A polyethylene terephthalate copolymer will be explained as below. The recurring unit of ethylene terephthalate preferably accounts for at least 85 mol %, more preferably at least 90 mol %, particularly preferably at least 95 mol % of the total recurring units. When the content of a third component is too large, undesirably, the light transmissivity of the film decreases, and the thermal stability and dimensional stability thereof are degraded. Examples of the third component of the copolymer include aromatic dicarboxylic acids such as isophthalic acid, phthalic acid and 2,6-naphthalenedicarboxylic acid; aliphatic dicarboxylic acids such as adipic acid, azelaic acid, sebacic acid and 1,10-decanedicarboxylic acid; aliphatic diols such as 1,4-butanediol, 1,6-hexanediol and neopentyl glycol, and alicyclic diols such as 1,4-cyclohexanedimethanol. Of these, isophthalic acid is particularly preferred. These may be used alone or in combination of two or more. For example, in an isophthalate-polyethylene terephthalate copolymer, the content of an isophthalic acid component is preferably 5 mol % or less based on the total acid components, and the content of dicarboxylic acid component or a diol component as other third component in the copolymer may be 3 mol % or less as required.

The above polyethylene terephthalate can be produced, for example, by a method in which terephthalic acid and ethylene glycol are reacted in polycondensation, a method in which a lower alkyl ester of terephthalic acid and ethylene glycol are subjected to an ester interchange reaction and then a reaction product is subjected to polycondensation, or a method in which a bisglycol ester of terephthalic acid is subjected to polycondensation. Polyethylene-2,6-naphthalate can be also produced by a similar method.

Concerning the molecular weight of the above polyester, when the polymerization degree thereof is too low, the film has low mechanical strength, so that the value of its intrinsic viscosity (o-chlorophenol, 35° C.) is preferably at least 0.4, more preferably 0.5 to 1.2, particularly preferably 0.55 to 0.85.

When the polyester film is a laminated film formed of two layers or three layers, it has a constitution of layer (X)/layer (Y) or layer (Y)/layer (X)/layer (Y) (this constitution will be explained later). Desirably, the intrinsic viscosity ($\eta_X$) of the polyester constituting layer (X) is 0.4 to 0.6, preferably 0.45 to 0.58, and the intrinsic viscosity ($\eta_Y$) of the polyester constituting layer (Y) is equivalent to, or greater than, ($\eta_X$). Further, desirably, the intrinsic viscosity ($\eta_X$) is 0.5 to 1.2, preferably 0.55 to 0.85.

A catalyst for use in the polycondensation for the above polyester includes an antimony compound (Sb compound), a titanium compound (Ti compound) and a germanium compound (Ge compound). Of these, a germanium compound is preferred in that the film is improved in light transmissivity. The germanium compound is preferably selected from (a) amorphous germanium oxide, (b) fine crystalline germanium oxide, (c) a solution prepared by dissolving germanium oxide in glycol in the presence of an alkali metal, an alkaline earth metal or compounds thereof and (d) a solution prepared by dissolving germanium oxide in water.

When an antimony compound is used alone or in combination with other catalyst as a catalyst in the polycondensation for the above polyester, preferably, the content of antimony in the polymer is 15 mmol % or less per mole of the total acid components. When the content of antimony exceeds the above amount, the polyester film comes to have a light transmissivity of less than 90%, and the film can be no longer used for a light-diffusing plate.

The polyester film as a base film for constituting the polyester film composite material of the present invention is a biaxially oriented film, and the thickness thereof is at least 50 μm but not greater than 200 μm, preferably at least 75 μm but not greater than 175 μm. When the thickness of the polyester film is less than 50 μm, the film has a weak nerve (low toughness), and the film is liable to lose its flatness and is liable to be scratched during its processing. When the thickness of the film exceeds 200 μm, undesirably, the toughness thereof is too high, the proccessability thereof comes to be poor, and the transparency thereof also decreases.

The above polyester film as a base film may be a single-layered film or a laminated film formed of two layers or three layers. When the polyester film is a laminated film formed of two layers or three layers, there can be obtained a film having different properties between front and reverse surfaces, and there can be obtained a film formed of polyesters having different properties. Specific embodiments of the laminated film will be explained in detail later.

In the polyester film composite material of the present invention, an easy-adhesion coating is formed on one surface or each surface, preferably each surface, of the above base film. The above polyester film composite material is remarkably excellent in transparency. That is, it has a haze value of less than 2%, preferably less than 1.5% and a total light transmissivity of at least 90%, preferably at least 93%. When the haze value of the polyester film composite material exceeds 2%, no brilliance required of the light-diffusing plate can be obtained. The haze value differs mainly depending upon types, average particle diameters and contents of inert fine particles on the polyester film and degrees of voids that occur around the particles, so that it is preferred to adjust these factors to satisfy a desired haze value.

When the total light transmissivity of the polyester film composite material is less than 90%, no brilliance required of the light-diffusing plate can be obtained. For obtaining the above high light transmissivity of a polyester film having a general transparency grade, it is essential to apply an easy-adhesion coating to be described later on the film surface as well as a method of attaining the above low haze value. It is thought that an improvement in the total light transmissivity is an anti-reflection effect of the easy-adhesion coating, which is an unexpected effect.

For securing stable productivity and proccessability, preferably, the biaxially oriented film as a base film for the polyester film composite material of the present invention has a number of fine protrusions on one surface or both surfaces thereof. A number of the above fine protrusions on the film surface or surfaces are formed by dispersing inert fine particles in the polyester.

The inert fine particles dispersed in the polyester are not limited in type, size and content so long as occurrence of voids around the fine particles in the film are prevented to the utmost so that the haze value and the total light transmissivity of the film satisfy the above ranges.

For obtaining a polyester film composite material having a low haze value and a high total light transmissivity, preferably, the inert fine particles to be dispersed in the polyester are porous silica particles or plate-like aluminum particles. Particles that are excellent in transparency and serve to prevent scratching of the film during the formation and processing of the film, such as spherical silica, can be also preferably used. One type of the inert fine particles may be used, or two or more types of the inert fine particles may be also used.

As described already, for retaining productivity and proccessability and securing transparency of the biaxially oriented polyester film as a base film, preferably, the polyester constituting a single-layered film or an outer film of a laminated film contains at least 0.001% by weight but not more than 0.1% by weight of porous silica particles and/or plate-like aluminum silicate particles having an average particle diameter of at least 0.1 μm but not greater than 3 μm.

When the biaxially oriented polyester film as a base film is a laminated polyester film formed of two layers or three layers, it can be a polyester film in which a polyester layer (B) containing at least 0.001% by weight but not more than 0.1% by weight of porous silica particles and/or plate-like aluminum silicate particles having an average particle diameter of at least 0.1 μm but not greater than 3 μm is laminated on one surface or each surface of a polyester film (A) having an inert fine particle content of 0.005% by weight or less. The above laminated film can serve to decrease the content of the inert fine particles as a whole and is excellent in retaining transparency at a high level.

The above porous silica particles are preferably constituted of aggregates of primary particles having an average particle diameter of at least 0.01 μm but not greater than 0.1 μm. The porous silica particles exhibit high affinity to polyesters, particularly to polyethylene terephthalate. When the average particle diameter of the primary particles is less than 0.01 μm, undesirably, the particles have a large specific surface area, so that the particles are liable to aggregate and are liable to form coarse particles. When such coarse particles are incorporated into the film, they come to decrease the light transmissivity of the film. When the average particle diameter of the primary particles exceeds 0.1 μm, undesirably, the particles come to loose their porosity, their affinity to polyesters disappears, voids are liable to occur around the particles, and the light transmissivity of the film is caused to decrease.

The above average particle diameter of primary particles refers to an average particle diameter obtained by tracing or projecting images of primary particles observable in a magnification photograph taken through a transmission electron microscope of 100,000 magnifications and determining diameters of the primary particles as diameters of circles having the same areas as those of the primary particles by means of an image analyzer.

The average particle diameter (secondary particle diameter) of the above porous silica particles is preferably at least 0.1 μm but not greater than 3.0 μm, more preferably at least 0.7 μm but not greater than 2.5 μm, particularly preferably at least 1.0 μm but not greater than 2.3 μm. The content of the porous silica particles is preferably at least 0.001% by weight but not more than 0.1% by weight, more preferably at least 0.002% by weight but not more than 0.08% by weight, particularly preferably at least 0.003% by weight but not more than 0.05% by weight. When the above content is less than 0.001% by weight, undesirably, a roller and the film cause friction at the step of forming the film, particularly at a stretching step, and a number of acicular scratches sometimes occur on the surface of the film. When it exceeds 0.1% by weight, undesirably, the desired haze value or light transmissivity can be obtained in few cases.

The pore volume of the above porous silica particles is preferably 0.5 to 2.0 ml/g, more preferably 0.6 to 1.8 ml/g. When the pore volume is less than 0.5 ml/g, undesirably, the porous silica has poor porosity, so that the affinity to the polyester disappears. When it exceeds 2.0 ml/g, undesirably, aggregation is liable to take place, and it is difficult to adjust the particle diameter.

Further, the above plate-like aluminum silicate particles can be also called plate-like aluminum silicate particles. Any plate-like aluminum silicate particles may be used as any one, and examples thereof include kaolin clay made of naturally occurring kaolin mineral. Further, the kaolin clay may be a product prepared by purification treatment such as washing with water.

The average particle diameter of the above plate-like aluminum silicate particles is preferably 0.1 to 3.0 μm, more preferably 0.3 to 2.0 μm. The content thereof is at least 0.001% by weight but not more than 0.1% by weight, more preferably at least 0.002% by weight but not more than 0.08% by weight. When the above average particle diameter is less than 0.1 μm, undesirably, the lubricity of the film is impaired, and the film is degraded in productivity and proccessability. When it exceeds 3 μm, undesirably, the light transmissivity of the film decreases. When the above content is less than 0.001% by weight, undesirably, a role and the film cause friction at the step of forming the film, particularly at a machine-direction stretching step, and a number of acicular scratches occurs in the film surface. When the above content exceeds 0.1% by weight, undesirably, the haze value and light transmissivity of the film decrease.

The above average particle diameter (secondary particle diameter) of the porous silica particles and the above average particle diameter of the plate-like aluminum silicate particles refer to "equivalent sphere diameter" of particles at the point of 50% by weight of all the particles measured. The "equivalent sphere diameters" refers to a diameter of an imaginary sphere (ideal sphere) having the same volume as that of a particle and can be determined on the basis of an electron microscope photograph of particles or measurement according to a precipitation method.

The method of incorporating the above inert fine particles into the polyester can be selected from any known methods. For example, the inert fine particles can be dispersed in, and incorporated into, the polymer during polymerization of the polyester by dispersing uniformly the inert fine particles in ethylene glycol by means of ultrasonic vibration, wet-classifying and purifying the particles according to a known method as required and adding the purified particles into the polymer.

The biaxially oriented polyester film in the present invention, which is any one of a single-layered film or a laminated film, has a thickness of at least 50 μm but not more than 200 μm, preferably at least 75 μm but not more than 175 μm. When the above thickness is less than 50 μm, the film has a weak nerve, and the flatness may be lost and scratches are liable to occur during its processing. When it exceeds 200 μm, undesirably, the nerve is too high, so that the workability is poor, and the transparency decreases.

The above biaxially oriented polyester film is not limited by a production method thereof, and it can be produced, for example, by any one of a consecutive biaxially stretching method, a simultaneous biaxially stretching method and an inflation method that are conventionally known. Of these, a consecutive biaxially stretching method is preferred. The laminated polyester film can be obtained by a co-extrusion method that is known per se.

In the consecutive biaxially stretching method or the simultaneous biaxially stretching method, first, a polyester having a predetermined composition is melt-extruded through a die and rapidly cooled to solidness on a casting drum pre-set around 20 to 40° C., to obtain an unstretched film. In this case, the firm surface that comes in contact with the casting drum surface is rapidly cooled, while the cooling of the other surface is delayed When the unstretched film particularly has a thickness of 1 mm or greater, the above delay is great and the crystallization of this surface (the other surface) proceeds, so that a biaxially oriented film has a roughened surface, which results in a sharp difference between the front and reverse surfaces in the surface properties. As means for reducing the above phenomenon, it is preferred to blow cold air against the unstretched film at a high rate on the casting drum on an air-side surface (surface opposite to the surface that comes in contact with the casting drum surface) to forcibly cool the film. The thus-obtained unstretched film preferably has a thickness of at least 0.5 mm. While the unstretched film is then biaxially stretched under generally well-known conditions, it is preferred to stretch the film 3.0 to 4.5 times as large in the film-running direction (machine direction) and stretch the film 3.0 to 4.5 times as large in the parpendicular direction (transverse direction) with the above direction, 9 to 20 times as large in terms of area stretch ratio. The stretching temperature is preferably 90° C. to 140° C.

Further, the biaxially stretched film can be thermally set as required. The thermally setting temperature is preferably 180 to 250° C., more preferably 210 to 235° C. The biaxially stretched film has a thickness of 50 to 200 μm.

The constitution of the laminated polyester film, when used as a base film, will be explained below.

The above laminated film has a layer structure of (X)/(Y) or (Y)/(X)/(Y). The advantages thereof in comparison with a single-layered film are as follows. (1) The inert fine particles in a necessary amount are used in a necessary layer alone, and the amount of lubricant particles in other portion is decreased if possible, whereby the transparency of the entire film can be increased. (2) Different polyesters can be used. That is, a recycled polymer is used in (X) layer, and the yield of use of a source polymer is improved, so that the productivity is improved.

The recycled polymer used in the above (2) particularly refers to a polymer obtained by recovering those portions that cannot constitute a product, such as a portion gripped with a clip of a lateral stretching machine and a portion that passes through a film-forming machine as a leading end, pulverizing them and melting them during the film-forming. This polymer can be used as a raw material for the production.

It is preferred to use the above recycled polymer in (X) layer that constitutes the central layer of the laminated film, since the productivity is improved. When the recycled polymer is used as the entire polymer for (X) layer, however, the inert fine particles contained in the polymer for (Y) layer are accumulated, and the concentration thereof gradually increases. Further, since the recycled polymer has a long heat-melting history as compared with a fresh polymer, depolymerization, etc., which take place during its melting, cause the intrinsic viscosity of the recycled polymer to decrease. For overcoming these problems, preferably, 10 to 70% by weight of a polyester polymer containing no inert fine particles are used as a polymer for (X) layer in addition to the recycled polymer. As a polymer for (X) layer, particularly preferably, the recycled polymer and a fresh polymer are mixed in such an amount ratio that the content of the inert fine particles in the polymer for (X) layer is in the range of from 0.00009 to 0.005% by weight and that the intrinsic viscosity of the polymer for (X) layer is lower than that of the polymer for (Y) layer and is in the range of from 0.40 to 0.6.

In the polyester film composite material of the present invention, an easy-adhesion coating is formed on one surface or each surface of the above biaxially oriented polyester film. The above coating is not limited so long as it exhibits adhesion to a light-diffusing layer. However, the above coating preferably has a composition containing (A) a water-base polyester resin, (B) an acrylic resin and (C) fine particles as main components.

According to studies made by the present inventors, it has been found that it is preferred for the polyester film composite material as an end product to form the above easy-adhesion coating from the following coating composition (I) or (II).

Coating Composition (I):
A composition composed substantially of (A) a water-base polyester resin having a glass transition point of 40 to 80° C., (B) an acrylic resin having a glass transition point of 25 to 75° C. and (C) fine particles.

Coating Composition (II):
A composition composed substantially of (A) a water-base polyester resin having a glass transition point of 40 to 80° C., (B) an acrylic resin having a glass transition point of 25 to 75° C., (C) fine particles and (D) an aliphatic amide and/or an aliphatic bisamide.

In the above coating compositions (I) and (II), the (A) water-base polyester resin is preferably a copolyester resin having a glass transition temperature of 40 to 80° C. and having a molecule containing 8 to 20 mol %, preferably 9 to 16 mol %, based on the total dicarboxylic acid components, of a dicarboxylic acid component having a group of —$SO_3M$ (in which M is a metal atom in an equivalent weight equal to —$SO_3$, an ammonium group or a quaternary phosphonium group). When the content of the group of —$SO_3M$ is in the above range, the coating is excellent in adhesion to transparent resin beads, particularly, acrylic resin beads contained in a light-diffusing layer to be laminated on the coating surface and in adhesion to the base film.

In the above group of —$SO_3M$, M is preferably an alkali metal atom such as litium, sodium or potassium, or an alkaline earth metal atom such as magnesium or calcium, particularly preferably sodium or potassium. Further, M is also preferably an ammonium group, a tetraethylammonium group or a tetrabutylphosphonium group.

Examples of the dicarboxylic acid containing the group of —$SO_3M$ include 5-sulphoisophthalic acid derivatives represented by the following formula (1). More specifically, examples thereof include compounds of the following formula (1) in which M is Na, K or Li. These may be used alone or in combination two or more.

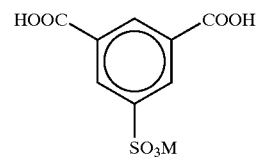

Examples of the other dicarboxylic acid components for constituting the above (A) water-base polyester resin include aromatic dicarboxylic acids such as terephthalic acid, phthalic acid, isophthalic acid, 2,6-naphthalenedicarboxylic acid, diphenylketonedicarboxylic acid, 4,4'-diphenyldicarboxylic acid and anthracenedicarboxylic acid; aliphatic dicarboxylic acids such as adipic acid and sebacic acid; alicyclic dicarboxylic acids such as cyclohexane-1,4-dicarboxylic acid; and dimmer acid. The copolyester resin contains at least two of these. The copolyester resin may further contain, as an acid component, maleic acid, fumaric acid, itaconic acid, etc., together with the above dicarboxylic acids.

Examples of the glycol component for constituting the above (A) water-base polyester resin include alkylene glycols having 2 to 10 carbon atoms such as ethylene glycol, trimethylene glycol, tetramethylene glycol (1,4-butanediol), pentamethylene glycol, neopentyl glycol, hexamethylene glycol and decamethylene glycol; alicyclic diols such as cyclohexanedimethanol; dialkylene glycols such as diethylene glycol and dipropylene glycol; aromatic-ring-possessing diols such as hydroquinone, resorcin, 2,2-bis(4-hydroxyphenyl)propane and 1,4-dihydroxydimethylbenzene; polyalkylene glycols (polyoxyalkylene glycols) such as polyethylene glycol, polypropylene glycol and polytetramethylene glycol, and others including an alkylene oxide adduct of bisphenol A and an alkylene oxide adduct of hydroquinone.

In addition to the above dicarboxylic acid components and the glycol component, the above water-base polyester resin may contain a small amount of hydroxycarboxylic acid components such as p-hydroxybenzoic acid and p-(β-hydroxyethoxy)benzoic acid.

The above water-base polyester resin may further contain a trifunctional or higher polyfunctional compound component in such a small amount that properties of a linear polymer are maintained. Examples of such a compound include trimellitic acid, dimethylolpropionic acid, glycerin and trimethylolpropane.

The above water-base polyester resin preferably has a number average molecular weight of 4,000 to 27,000. Further, it preferably has a glass transition point of 40 to 80° C., more preferably 45 to 75° C. When the glass transition point of the water-base polyester resin is within the above range, the polyester film composite material can be improved in anti-blocking property and can be also improved in transparency.

The above water-base polyester resin can be produced by a method that is known per se. For example, it can be easily obtained by providing a dicarboxylic acid having a group of —$SO_3M$ or an ester-forming derivative thereof, other dicarboxylic acid or an ester-forming derivative thereof and a glycol as starting materials, subjecting the starting materials to an esterification or ester-interchange reaction, and carrying out polycondensation of a reaction product. Since the relationship between a polymer composition and a glass transition point can be found by preliminary experiments, the water-base polyester resin having a desired glass transition point can be easily produced on the basis of such a finding.

In the coating compositions (I) and (II), the glass transition point of the above (B) acrylic resin is preferably 25 to 70° C., more preferably 40 to 66° C. When the glass transition point is in the above range, the polyester film composite material of the present invention is excellent in adhesion, anti-blocking property and transparency. The number average molecular weight of the acrylic resin is preferably in the range of from 10,000 to 1,000,000, more preferably 100,000 to 500,000.

The above (B) acrylic resin includes polymers or copolymers of acrylic monomers such as methyl methacrylate, ethyl methacrylate, butyl methacrylate, methyl acrylate, ethyl acrylate, butyl acrylate, acrylic acid, methacrylic acid, acrylamide, N-methylolacrylamide, glycidyl methacrylate, acrylonitrile, β-hydroxyethyl acrylate and ammonium acrylate, and a copolymer of any one of the above monomers and a small amount of a vinyl monomer typified by styrene. The acrylic resin refers to a non-crosslinking polymer.

The above (B) acrylic resin is preferably a water-soluble resin in view of an easiness in preparation of a coating solution as a water-base solution.

Further, examples of the above (C) fine particles in the present invention include inorganic fine particles such as calcium carbonate, magnesium carbonate, calcium oxide, zinc oxide, magnesium oxide, silicon oxide, sodium silicate, aluminum hydroxide, iron oxide, zirconium oxide, barium sulfate, titanium oxide, tin oxide, antimony trioxide, carbon black and molybdenum disulfide, and organic fine particles such as an acrylic crosslinked polymer, a styene-based crosslinked polymer, a silicone resin, a fluorine resin, a benzoguanamine resin, a phenolic resin, a nylon resin and polyethylene wax. Of those that are water-insoluble substances, it is preferred to select ultrafine particles having a specific gravity that does not exceed 3, for avoiding their precipitation in a dispersion thereof in water. The above surface-roughening substances work not only to roughen the coating surface but also to strengthen the coating by the fine powders themselves. Further, they work to impart the coating with an anti-blocking property, so that they impart the film with excellent lubricity.

The average particle diameter of the above (C) fine particles is 0.01 to 0.30 μm, preferably 0.05 to 0.25 μm. When the above particle diameter is less than 0.01 μm, blocking takes place and causes the yield in the production of diffusing plates to decrease. When the above average particle diameter exceeds 0.30 μm, undesirably, particles are liable to drop off from the coating, so that the surface of a light-guiding plate or lens film may be scratched when the diffusing plate is placed on the light-guiding plate or placed on the lens film, or separation of layers may take place to cause non-uniformity in brilliance.

The (D) fatty acid amide and fatty acid bisamide in the coating composition (II) refer to compounds of $R^1CONH_2$ and $R^1CONHR^3NHOCR^2$, respectively, in which $R^1CO$— or $R^2CO$— is a fatty acid residue and —$NHR^3NH$— is a diamine residue.

The above fatty acid is preferably a saturated or an unsaturated fatty acid having 6 to 22 carbon atoms.

The above (D) fatty acid amide and fatty acid bisamide preferably include, for example, N,N'-alkylenebisamide having 13 to 15 carbon atoms and having a molecular weight of 200 to 800. More specifically, examples thereof include N,N'-methylenebis-stearic acid amide, N,N'-ethylenebispalmitic acid amide, N,N'-methylenebislauric acid amide, linoleic acid amide, capric acid amide and stearic acid amide. Of these, bisamide of the following formula (1) is particularly preferred.

$$RCONH(CH_2)_nNHOCR \tag{1}$$

wherein RCO— is a fatty acid residue, and n is 1 or 2.

Concerning the amount ratio of the (A) water-base polyester resin, the (B) acrylic resin and the (C) fine particles in the above coating composition (I), preferably, on the basis of the total amount of these, he amount of the (A) water-base polyester resin is 20 to 80% by weight, the amount of the (B) acrylic resin is 10 to 50% by weight and the amount of the (C) fine particles is 5 to 25% by weight. When the above amounts are within the above ranges, the polyester film composite material is excellent in running properties, adhesion, anti-blocking property and transparency.

In the above coating composition (II), the amount of the (A) water-base polyester resin is 40 to 80% by weight, preferably 50 to 70% by weight, and the amount of the (B) acrylic resin is 1 to 50% by weight, preferably 5 to 45% by weight. Further, the amount of the (C) fine particles is 0.1 to 30% by weight, preferably 0.3 to 20% by weight. When relatively large particles having an average particle diameter of 0.1 μm or greater are particularly used, preferably, the amount thereof is 0.1 to 10% by weight. When particles having an average particle diameter of 0.01 to 0.1 μm are used, preferably, the amount thereof is 0.5 to 30% by weight.

Further, the content of the (D) fatty acid amide and/or the fatty acid bisamide in the composition for forming the coating is preferably 3 to 10% by weight, more preferably 4 to 9% by weight. When the content of the fatty acid amide and/or the fatty acid bisamide is within the above range, the film is improved in adhesion and is improved in lubricity and anti-blocking property. When the content of (D) is too large, undesirably, the adhesion between the film and the coating decreases, the coating is caused to be fragile, and the film is also caused to have a high haze.

In addition to the above components, further, the easy-adhesion coating of the polyester film composite material of the present invention may contain other resin, a surfactant, an anti-static agent, a lubricant and an ultraviolet absorbent in such amount ranges that achievement of the object of the present invention is not impaired.

The thickness of the easy-adhesion coating is preferably 0.06 to 0.16 μm, more preferably 0.10 to 0.14 μm. When the thickness of the coating is less than 0.06 μm, the strength of adhesion to a light-diffusing material (e.g., acryl beads adhesive) is insufficient, and it is difficult to improve optical property values such as light transmissivity. When the thickness of the coating exceeds 0.16 μm, coloring caused by selective absorption may take place to impair optical properties, and at the same time, blocking may be caused.

The coating solution for use in the present invention for forming the easy-adhesion coating is used in the form of an aqueous solution, a dispersion in water or an emulsion. In addition to the above water-base polyester resin, the above coating solution may contain other resins such as a polymer having an oxazoline group, melamine and epoxy, a crosslinking agent such as aziridine, an antistatic agent, a colorant, a surfactant and an ultraviolet absorbent as required. The solid concentration of the water-base coating solution is generally 0.5 to 30% by weight, further, preferably 1.0 to 10% by weight. When the above concentration is less than 0.5% by weight, undesirably, the coatability to the polyester film is insufficient. When it exceeds 30% by weight, undesirably, the coating comes to have a poor appearance.

The easy-adhesion coating can be generally formed on the surface of the biaxially oriented polyester film as a base film by dissolving, dispersing or emulsifying the (A) water-base polyester resin, the (B) acrylic resin and optionally the (C) fatty acid amide and/or fatty acid bisamide, dispersing the (D) fine particles to obtain a water-base dispersion (solution), applying the water-base dispersion (solution) to one surface or both surfaces of the polyester film and drying the thus-formed coating.

While the coating solution can be applied to the polyester film at any stage, it is preferred to carry out the application at the step of producing the polyester film, and it is more preferred to apply the coating solution to the polyester film before completion of orientation crystallization. The polyester film before completion of the orientation crystallization includes an unstretched film, a monoaxially stretched film obtained by stretching an unstretched film in one direction, the longitudinal direction or the transverse direction, and an oriented film obtained by stretching an unstretched film in two directions, the longitudinal and transverse directions, at low stretch ratios (biaxially oriented film before final re-stretching that is carried out in the longitudinal and transverse directions to complete orientation crystallization). Of these, it is preferred to apply the above coating solution to the unstretched film or the monoaxially stretched film that is oriented in one direction, and to carry out stretching of the thus-coated film in the longitudinal and/or transverse direction(s) and thermal setting.

For applying the coating solution to the film, it is preferred to carry out physical treatment such as corona surface treatment, burning treatment or plasma treatment on the film surface as a preliminary treatment for improving coatability of the film, or it is preferred to use a chemically inert surfactant in combination with the coating composition. The above surfactant is for promoting wettability of the water-base coating solution to the polyester film, and examples thereof include anionic surfactants and nonionic surfactants such as polyoxyethylene alkylphenyl ether, polyoxyethylene fatty acid ester, sorbitan fatty acid ester, glycerin fatty acid ester, fatty acid metallic soap, alkyl sulfate, alkyl sulfonate and alkylsulfosuccinate.

As an application method, any known application method can be employed. For example, a roll coating method, a gravure coating method, a roll blushing method, a spray coating method, an air knife coating method, an impregnation method and a curtain coating method can be employed alone or in combination. The application is carried out on both the surfaces of the film.

The thus-formed coating has a uniform surface and has no non-uniformity. Moreover, the coating has high adhesion strength to the light-diffusing material, beads of an acrylic resin in particular, so that it is excellent in adhesion when a light-diffusing layer containing such beads is formed on one surface or each surface of the film for producing the light-diffusing plate made of such beads.

The polyester film composite material of the present invention is required to have a haze value of less than 2%, preferably less than 1.5%. When the haze value exceeds 2%, no brilliance required of the light-diffusing plate can be obtained. Since the above haze value differs depending mainly upon types, average particle diameters and contents of the inert fine particles in the polyester film and degrees of voids that take place around the particles, it is preferred to adjust these factors to attain a desired haze value.

The total light transmissivity of the polyester film composite material of the present invention is at least 90%, preferably at least 93%. When the above total light transmissivity is less than 90%, no brilliance required of the light-diffusing plate can be obtained. For attaining the above high total light transmissivity that exceeds the total light transmissivity of a polyester film having a general transparency grade, it is essential to form the above easy-adhesion coating on both the surfaces of the film together with a method of obtaining the above low haze value. An improvement in the total light transmissivity is presumably the anti-reflection effect of the easy-adhesion coating and is an unexpected effect. Further, the use of not an antimony-containing catalyst but a germanium-containing catalyst produces the effect.

Particularly preferred embodiments of the polyester film composite material of the present invention are as shown in the following embodiments (1) to (3).

Embodiment (1):

Polyester film composite material comprising (I) a biaxially oriented polyester film formed of polyethylene terephthalate containing at least 0.001% by weight but not more than 0.1% by weight of porous silica particles and/or plate-like aluminum silicate particles having an average particle diameter of at least 0.1 μm but not greater than 3 μm, and (II) a coating composition substantially containing (A') a water-base polyester containing 8 to 20 mol %, based on the content of total dicarboxylic acid components, of a dicarboxylic acid component having —$SO_3M$ (in which M is a metal atom, ammonium salt or quaternary phosphonium salt) in its molecule and having a glass transition point of 40 to 80° C., (B) an acrylic resin having a glass transition point of 25 to 75° C. and (C) fine particles, (III) the biaxially oriented polyester film having a structure in which a coating of said coating composition is formed on both the surfaces of said biaxially oriented polyester and having a haze value of less than 2% and a total light transmissivity of at least 90%.

Embodiment (2):

Polyester film composite material comprising (I) a biaxially oriented polyester film formed of polyethylene terephthalate containing at least 0.001% by weight but not more than 0.1% by weight of porous silica particles and/or plate-like aluminum silicate particles having an average particle diameter of at least 0.1 µm but not greater than 3 µm, and (II) a coating composition substantially containing (A') a water-base polyester containing 8 to 20 mol %, based on the content of total dicarboxylic acid components, of a dicarboxylic acid component having —$SO_3M$ (in which M is a metal atom, ammonium salt or quaternary phosphonium salt) in its molecule and having a glass transition point of 40 to 80° C., (B) an acrylic resin having a glass transition point of 25 to 75° C., (C) fine particles and (D) aliphatic amide and/or aliphatic bisamide, (III) the biaxially oriented polyester film having a structure in which a coating of said coating composition is formed on both the surfaces of said biaxially oriented polyester and having a haze value of less than 2% and a total light transmissivity of at least 90%.

Embodiment (3):

Polyester film composite material comprising (I) a polyester film that is a laminated biaxially oriented polyester film formed of laminated two or three layers formed of polyethylene terephthalate, said film being a film wherein a polyester layer (Y) containing at least 0.001% by weight but not more than 0.1% by weight of porous silica particles and/or plate-like aluminum silicate particles having an average particle diameter of at least 0.1 µm but not greater than 3 µm is laminated on each surface or one surface of a polyester film layer (X) having an inert-fine-particles content of 0.005% by weight or less, and (II) a coating composition substantially containing (A') a water-base polyester containing 8 to 20 mol %, based on the content of total dicarboxylic acid components, of a dicarboxylic acid component having —$SO_3M$ (in which M is a metal atom, ammonium salt or quaternary phosphonium salt) in its molecule and having a glass transition point of 40 to 80° C., (B) an acrylic resin having a glass transition point of 25 to 75° C., (C) fine particles and optionally, (D) aliphatic amide and/or aliphatic bisamide, (III) the biaxially oriented polyester film having a structure in which a coating of said coating composition is formed on both the surfaces of said biaxially oriented polyester and having a haze value of less than 2% and a total light transmissivity of at least 90%.

In the polyester film composite material of the present invention, a light-diffusing layer is laminated on each surface or one surface thereof, preferably on each surface thereof, and the resultant laminate is advantageously used as a light-diffusing plate. The thus-obtained light-diffusing plate has a brilliance of at least 200 cd/m$^2$, and it is excellent as a light-diffusing plate for a liquid crystal display.

The polyester film composite material of the present invention can be also laminated on a glass plate through its easy-adhesion coating surface. The thus-obtained composite glass is used as a composite glass having excellent transparency.

EXAMPLES

The present invention will be further explained with reference to Examples hereinafter. "Part" stands for "part by weight". Methods for measuring various properties are as follows.

(1) Film Thickness

A film is measured in 100 points with an externally attached micrometer, and an average value is calculated and used as a film thickness.

(2) Haze Value

A film is measured for a haze value with a haze meter (NDH-20) supplied by Nippon Denshoku Kogyo K. K.

(3) Total Light Transmissivity

A haze meter (NDH-20) supplied by Nippon Denshoku Kogyo K. K. is used, a trap is removed, and a standard white plate is attached. A ratio of a total light transmission quantity in the presence of a sample to a total light transmission quantity in the absence of any sample is expressed as %.

(4) Primary Particle Diameter

A film containing particles was sliced in the cross-sectional direction to obtain an ultra-thin piece having a thickness of 100 nm, and the ultra-thin piece is photographically observed through a transmission electron microscope (JEM-1200EX supplied by Nippon Denshi) at a magnification of 100,000 for particles, that is, aggregated particles (secondary particles) and primary particles constituting them. On this photograph, 1,000 particles were measured for primary particle diameters as diameters of circles having the same areas by means of an image analyzer, and an average of measurement values is used as a primary particle diameter. Particle species are determined by quantitative analysis, etc., of metal atoms according to SEM-XMA or ICP.

(5) Average Particle Diameter of Particles

Measured with a centrifugal particle size analyzer CP-50 supplied by Shimadzu Corporation. In an integration curve of particles having diameters and amounts of the particles calculated on the basis of an obtained centrifugal precipitation curve, a particle diameter corresponding to a 50 mass percent is read and used as the above average particle diameter (see "Ryudo Sokutei Gijutu", issued by Nikkan Kogyo Shinbun, 1975, pages 242-247).

(6) Pore Volume of Particles

On the assumption that pores of a powder are filled with nitrogen, a nitrogen adsorption amount under a relative pressure of 0.98 is determined by nitrogen adsorption measurement using a constant volume method with Autosorb-1 by CANTACHROME Co., Ltd., to determine the pore volume of the powder.

(7) Thickness of Easy-adhesion Coating

A sample is stained with osmic acid and encapsulated with an epoxy and the encapsulated sample is sliced with a microtome to obtain a 100 nm thick sample having a clear film side face. The thus-prepared sample is observed through a transmission electron microscope (JEM-1200EX, supplied by Nippon Denshi) at a magnification of 50,000 to 100,000 so as to close up an easy-adhesion layer, the layer is measured in arbitrary 100 points, and an arithmetical mean of measurement values is used.

(8) Thickness of Each Layer of Film

A sample is stained with osmic acid and encapsulated with an epoxy and the encapsulated sample is sliced with a microtome to obtain a 100 nm thick sample having a clear film side face. The thus-prepared sample is observed through a transmission electron microscope (JEM-1200EX, supplied by Nippon Denshi) at a magnification of 50,000 to 100,000 so as to close up a part of A layer and the entire B layer of a film, each layer is measured in arbitrary 100 points, and an arithmetical mean of measurement values is used.

(9) Quantitative Analysis of Antimony

A film is melted and molted to prepare a plate having a diameter of 5 cm and a thickness of 3 mm, and the plate is subjected to measurement with fluorescence X-rays (RIX3000, supplied by Rigaku) and quantitatively analyzed. While Cr or Rh is preferred for X-ray tube to be used, it is not critical so long as antimony can be quantitatively determined. In the quantitative determination, a calibration curve (axis of abscissas: antimony amount, axis of ordinates: detection amount (unit: cps) of antimony in a measurement sample) is prepared on the basis of samples whose antimony amounts are known, and antimony is determined on the basis of an antimony detection amount of the measurement sample.

(10) Property of Easy-adhesion Acrylic Resin

An acrylic resin coating agent is applied on the easy-adhesion coating of a film with a Meyer bar coat so as to form a layer having a dry weight 15 g/m$^2$, and the layer was dried at 80° C. for 3 minutes. Then, a cellophane adhesive tape (having a width of 18 mm, supplied by Nichiban) is attached to the surface of the acrylic resin coating layer, and rapidly peeled off to visually observe a peeled state, and such a state is evaluated on the basis of the following ratings.

○: Peeling of less than 5% (Excellent)

X: Peeling of 5% or more (Defective)

The above acrylic resin coating agent has the following composition.

A coating agent containing an acrylic resin main agent (A) (a solution of 40 wt % of acrylic resin components (methyl methacrylate/2-hydroxyethyl acrylate/2-ethylhexyl acrylate in a molar ratio of 20/2/1) in a solvent (solvent mixture of methyl ethyl ketone/isopropyl alcohol/toluene in a weight ratio of 25/25/50)), a curing agent (B) (hexamethylene diisocyanate in a molar ratio of 1), an anti-static agent (C) (a solution of 70 wt % of 2-aminoethylalkylphosphate in methyl ethyl ketone) and a diluent (D) (a mixture of methyl ethyl ketone/toluene in a weight ratio of 2/1) in an (A)/(B)/(C)/(D) weight ratio of 15/1/1/3.

(11) Brilliance

A lens-applied luminance meter BM-7 supplied by TOPCON Corporation is used to measure a brilliance (cd/m$^2$) in a viewing angle of ±80° (−90° in the cold cathode tube side, 0° C. in the front direction and +90° in the farthest direction from the cold cathode tube) on the surface of a light-diffusing plate 4 shown in FIG. 1, and a highest brilliance value is employed.

(12) Proccessability

The proccessability of a film in Example 1 when the film is processed into a light-diffusing plate is assumed to be excellent (○), a film that is inferior in proccessability is shown as Δ, and a film that is not processible is shown as X.

(13) Anti-blocking Property

A sample film and a film having no coating (Comparative Example 1) are stacked one on the other, and a pressure of 6 kg/cm$^2$ is applied onto the stacked films in an atmosphere of 60° C. and 80% RH for 17 hours. Then, the films are separated from each other, and the anti-blocking property based on peel strength thereof is evaluated on the basis of the following ratings.

◎: Peel strength<10 g/5 cm width . . . Remarkably excellent in anti-blocking property.

○: 10 g/5 cm width≦peel strength<15 g/5 cm width . . . Excellent in anti-blocking property.

Δ: 15 g/5 cm width≦peel strength<20 g/5 cm width . . . Good to some extent in anti-blocking property.

X: 20 g/5 cm width≦peel strength . . . Poor in anti-blocking property.

Example 1

A reactor was charged with 96 parts of dimethyl terephthalate, 58 parts of ethylene glycol, 0.038 part of manganese acetate and 0.041 part of antimony trioxide, respectively, and an ester interchange reaction was carried out with stirring while distilling out methanol until an internal temperature reached 240° C. After completion of the ester interchange reaction, 0.097 part of trimethyl phosphate was added. Then, a reaction product was temperature-increased, to finally carry out polycondensation under conditions of high vacuum and 280° C., whereby polyethylene terephthalate chips having an intrinsic viscosity ([η]) of 0.64 were obtained.

Then, 0.4% by weight of porous silica having an average particle diameter of 1.7 μm (primary particle diameter 0.004 μm, pore volume 1.2 ml/g) was added to part of the above polyethylene terephthalate chips, and the mixture was dried at 170° C. for 3 hours, fed to a twin-screw extruder, melt-kneaded at 280° C. and rapidly cooled to solidness to give master chips.

The polyethylene terephthalate chips and the above master chips were blended such that the porous silica in the polymer had a concentration of 0.008% by weight, and the blend was dried at 160° C. for 3 hours, melt-extruded at 295° C. and rapidly cooled to solidness on a cooling drum maintained at 20° C., to give an unstretched film. Then, the unstretched film was stretched 3.5 times as large in the longitudinal direction at 95° C., and then the following coating agent was applied onto the lower surface thereof and further onto the upper surface thereof, such that a dry coating of the coating agent on each surface had a thickness of 0.04 μm. Further, the film was stretched 3.8 times as large in the transverse direction at 110° C. and then heat-treated at 230° C., to give a biaxially oriented polyester film having a thickness of 100 μm. Table 1 shows properties of the thus-obtained film.

The obtained biaxially oriented polyester film was cut into a 215×290 mm film, and semi-spherical acryl beads having a diameter of 20 μm and a height of 10 μm were bonded to the entire reverse surface thereof (on the light-guiding plate side) at a projection/projection pitch of approximately 30 μm. Semi-spherical acryl beads having the above dimensions were also bonded to the entire front surface at a projection/projection pitch of approximately 21 μm. The thus-prepared film was used as a light-diffusing plate, to prepare a test diffusing plate having a structure in which the liquid crystal panel and the lens sheet shown in FIG. 1 were removed, and the test diffusing plate was measured for a brilliance and a brilliance non-uniformity on the front surface thereof. Table 1 shows the results.

Coating Agent

A water-base solution (coating solution) containing 56 parts of a terephthalic acid-isophthalic acid-5-Na sulfoisophthalate (compound of the above chemical formula (1): accounting for 13 mol % based on the total of dicarboxylic acid components)-ethylene glycol-neopentyl glycol copolyester resin P (Tg=49° C.), 25 parts of a methyl methacrylate-ethyl acrylate-acrylic acid-methacrylamide-N-methylolacrylamide copolymer S (Tg: 42° C.), 10 parts of a crosslinked acrylic resin filler (having a diameter of 40 nm) and 9 parts of an ethylene oxide-propylene oxide copolymer and having their concentration of 4% was consecutively applied on both the surfaces of the above film with a roll coater.

Examples 2 to 5

Biaxially oriented polyester films having a thickness of 100 μm were obtained in the same manner as in Example 1 except that the polyester, the lubricant and the coating agent were changed as shown in Table 1. Table 1 shows properties of these films.

These films were used to prepare light-diffusing plates similar to the light-diffusing plate in Example 1, and the light-diffusing plates were evaluated. Table 1 shows the results.

Of coating agents, a water-base polyester resin Q and an acrylic resin T are as follows.

Water-base Polyester Resin Q:

A 2,6-naphthalenedicarboxylic acid-isophthalic acid-5-potassiumsulfoisophthalate (compound of the above formula (2): accounting for 11 mol % based on the total of dicarboxylic acids)-ethylene glycol-bisphenol A-ethylene oxide adduct copolymer (Tg: 55° C.).

Acrylic Resin T:

A methyl methacrylate-glycidyl methacrylate-butyl acrylate-N-methoxymethylacrylamide-β-hydroxyethyl methacrylate copolymer (Tg: 48° C.)

Comparative Example 1

A biaxially oriented polyester film having a thickness of 100 μm was obtained in the same manner as in Example 1 except that the easy-adhesion coating was not formed. The film had no capability of adhesion to acryl beads, so that it was not processable into a light-diffusing plate.

Comparative Example 2

A biaxially oriented polyester film having a thickness of 100μm and a light-diffusing plate were obtained in the same manner as in Example 1 except plate-like aluminum silicate (average particle diameter 0.9 μm) as lubricant particles were added in an amount of 0.08% by weight, which amount was similar to a general purpose grade. The film had a high haze value, the light-diffusing plate had a low brilliance, and the film was not suitable for a light-diffusing plate.

Comparative Example 3

A biaxially oriented polyester film having a thickness of 100 μm was obtained by using, as a polyester, a 23 mol % isophthalic acid/polyethylene terephthalate copolymer and changing temperature conditions in the production step thereof to be applied to the polyester. Since the film had a low softening point, it was not processable into a light-diffusing plate.

Comparative Example 4

A biaxially oriented polyester film was obtained in the same manner as in Example 1 except that the film thickness was changed to 25 μm and that an unstretched film was stretched 3.6 times as large in the longitudinal direction and 3.9 times as large in the transverse direction. Since the resultant film had a weak nerve and had poor proccessability into a light-diffusing plate, it was unsuitable for a light-diffusing plate.

Comparative Example 5

A biaxially oriented polyester film was obtained in the same manner as in Example 1 except that the film thickness was changed to 250 μm and that an unstretched film was stretched 3.2 times as large in the longitudinal direction and 3.3 times as large in the transverse direction. Since the resultant film had too strong a nerve and had not only poor proccessability into a light-diffusing diffusing plate but also a high haze value, it was unsuitable for a light-diffusing plate.

TABLE 1

|  |  | Ex. 1 | Ex. 2 | Ex. 3 | Ex. 4 | Ex. 5 |
|---|---|---|---|---|---|---|
| Type of polyester | | PET | PET | PET | PET | PET/IA3 |
| Type of lubricant particles | | Porous silica | Aluminum silicate | Porous silica | Aluminum silicate | Porous silica |
| Average particle diameter of lubricant particles μm | | 1.7 | 0.9 | 1.7 | 0.9 | 1.7 |
| Amount of lubricant particles, wt % | | 0.008 | 0.003 | 0.004 | 0.003 | 0.01 |
| Coating composition | Type of water-base polyester | P | P | Q | P | Q |
|  | Part by weight of water-base polyester | 56 | 56 | 50 | 56 | 56 |
|  | Type of acrylic resin | S | S | S | T | S |
|  | Part by weight of acrylic resin | 25 | 25 | 31 | 25 | 25 |
| Coating thickness μm | | 0.04 | 0.04 | 0.08 | 0.04 | 0.04 |
| Film thickness μm | | 100 | 100 | 100 | 100 | 100 |
| Haze value % | | 0.9 | 0.4 | 0.9 | 0.4 | 0.9 |
| Total light transmissivity % | | 90 | 91 | 95 | 93 | 90 |
| Property of easy-adhesion to acrylic resin | | ◯ | ◯ | ◯ | ◯ | ◯ |
| Evaluation for light-diffusing plate | Brilliance cd/m$^2$ | 230 | 220 | 225 | 225 | 230 |
|  | Processability | ◯ | ◯ | ◯ | ◯ | ◯ |
| General evaluation | | ◯ | ◯ | ◯ | ◯ | ◯ |

|  |  | C. Ex. 1 | C. Ex. 2 | C. Ex. 3 | C. Ex. 4 | C. Ex. 5 |
|---|---|---|---|---|---|---|
| Type of polyester | | PET | PET | PET/IA3 | PET | PET |
| Type of lubricant particles | | Porous silica | Aluminum silicate | Porous silica | Porous silica | Porous silica |
| Average particle diameter of lubricant particles μm | | 1.7 | 0.9 | 1.7 | 1.7 | 1.7 |

TABLE 1-continued

| Amount of lubricant particles, wt % | | 0.008 | 0.08 | 0.008 | 0.008 | 0.008 |
|---|---|---|---|---|---|---|
| Coating composition | Type of water-base polyester | — | P | P | P | P |
| | Part by weight of water-base polyester | — | 56 | 56 | 56 | 56 |
| | Type of acrylic resin | — | S | S | S | S |
| | Part by weight of acrylic resin | — | 25 | 25 | 25 | 25 |
| Coating thickness μ | | — | 0.04 | 0.04 | 0.04 | 0.04 |
| Film thickness μm | | 100 | 100 | 100 | 25 | 250 |
| Haze value % | | 0.9 | 7.2 | 0.9 | 0.07 | 2.3 |
| Total light transmissivity % | | 88 | 89 | 75 | 88 | 85 |
| Property of easy-adhesion to acrylic resin | | X | ○ | ○ | ○ | * |
| Evaluation for light-diffusing plate | Brilliance cd/m$^2$ | — | 150 | 200 | 240 | 200 |
| | Processability | X | ○ | X | Δ | X |
| General evaluation | | X | X | X | X | X |

Ex.: Example
C. Ex.: Comparative Example
PET: Polyethylene terephthalate
PET/IAx: x mol % isophthalic acid/polyethylene terephthalate
Aluminum silicate: Plate-like aluminum silicate
*: impossible to 180° peel

Example 6

A reactor was charged with 96 parts of dimethyl terephthalate, 58 parts of ethylene glycol and 0.038 part of manganese acetate, respectively, and an ester interchange reaction was carried out with stirring while distilling out methanol until an internal temperature reached 240° C. After completion of the ester interchange reaction, 0.097 part of trimethyl phosphate and a catalytic amount of amorphous germanium oxide were added. Then, a reaction product was temperature-increased, to finally carry out polycondensation under conditions of high vacuum and 280° C., whereby polyester chips having an intrinsic viscosity (η) of 0.64 were obtained.

Then, 0.4% by weight of porous silica having an average particle diameter of 1.7 μm (primary particle diameter 20 nm, pore volume 1.2 ml/g) was added to part of the above polyester chips, and the mixture was dried at 170° C. for 3 hours, then fed to a twin-screw extruder, melt-kneaded at 280° C., extruded and rapidly cooled to solidness to give master chips.

The polyester chips and the above master chips were blended such that the porous silica in the polymer had a concentration of 0.004% by weight, and the blend was dried at 160° C. for 3 hours, melt-extruded at 295° C. and rapidly cooled to solidness on a cooling drum maintained at 20° C., to give an unstretched film. Then, the unstretched film was stretched 3.5 times as large in the longitudinal direction at 95° C., and then the following coating agent P (coating solution) was applied onto the lower surface thereof and further onto the upper surface thereof, such that a dry coating of the coating agent on each surface had a thickness of 0.1 μm. Further, the film was stretched 3.8 times as large in the transverse direction at 110° C. and then heat-treated at 230° C., to give a biaxially oriented polyester film having a thickness of 100 μm. Table 2 shows properties of the thus-obtained film.

The obtained film was cut into a 215×290 mm film, and semi-spherical acryl beads having a diameter of 20 μm and a height of 10 μm were bonded to the entire reverse surface thereof (on the light-guiding plate side) at a projection/projection pitch of approximately 30 μm. Semi-spherical acryl beads having the above dimensions were also bonded to the entire front surface at a projection/projection pitch of approximately 21 μm. The thus-prepared film was used as a light-diffusing plate, to prepare a test diffusing plate having a structure in which the liquid crystal panel and the lens sheet shown in FIG. 1 were removed, and the test diffusing plate was measured for a brilliance and a brilliance non-uniformity on the front surface thereof. Table 2 shows the results.

Coating Agent
Coating Agent P:
(A) Water-base polyester resin (Tg=68° C.) 60% by weight
Acid components:
  Terephthalic acid (90 mol %)
  Isophthalic acid (6 mol %)
  Potassium 5-sulfoisophthalate (4 mol %)
Glycol components:
  Ethylene glycol (95 mol %)
  Neopentyl glycol (5 mol %)
(B) N,N'-Ethylenebiscaprylic acid amide 5% by weight
(C) Acryl copolymer (number average molecular weight: 248,000) 20% by weight
Composition:
  Methyl acrylate (65 mol %)
  Ethyl acrylate (28 mol %)
  2-Hydroxyethyl methacrylate (2 mol %)
  N-Methylolmethacrylamide (5 mol %)
(D) Acrylic resin fine particles (average particle diameter 0.03 μm) 10% by weight
(E) Polyoxyethylene nonylphenyl ether 5% by weight

Examples 7 to 9

Biaxially oriented films having a thickness of 100 μm were obtained in the same manner as in Example 6 except that the polyester and the coating thickness were changed as shown in Table 2. Table 2 shows properties of these films.

These films were used to prepare light-diffusing plates similar to the light-diffusing plate in Example 6, and the light-diffusing plates were evaluated. Table 2 shows the results.

Comparative Example 6

A biaxially oriented film having a thickness of 100 μm was obtained in the same manner as in Example 6 except that the easy-adhesion coating was not formed. Table 2 shows properties of the film.

The film had no capability of adhesion to acryl beads, so that it was not processable into a light-diffusing plate.

Comparative Example 7

A biaxially oriented film having a thickness of 100 μm and light-diffusing plates were obtained in the same manner as in Example 6 except that the amount of antimony was changed. Table 2 shows properties of the film and the plates.

The film had low light transmissivity, and the light-diffusing plate had low brilliance, so that the film was not suitable for a light-diffusing plate.

Comparative Example 8

A biaxially oriented film having a thickness of 100 μm was obtained by using as a polyester, a 23 mol % isophthalic acid/polyethylene terephthalate copolymer and changing temperature conditions in the production step thereof to be applied to be polyester. Table 2 shows properties thereof. Since the film had a low softening point, it was not processable into a light-diffusing plate.

Comparative Example 9

A biaxially oriented film was obtained in the same manner as in Example 6 except that the film thickness was changed to 25 μm, that an unstretched film was stretched 3.6 times as large in the longitudinal direction and 3.9 times as large in the transverse direction and that the coating agent was replaced with the following coating agent Q. Table 2 shows properties thereof. Since the resultant film had a weak nerve, and had poor proccessability into a light-diffusing plate and insufficient adhesion, it was unsuitable for a light-diffusing plate.

Coating Agent Q:
(A) Water-base polyester resin (Tg=90° C.) 60% by weight
Acid components:
   2,6-Naphthalenedicarboxylic acid (81 mol %)
   Isophthalic acid (15 mol %)
   Sodium 5-sulfoisophthalate (4 mol %)
Glycol components:
   Ethylene glycol (95 mol %)
   Adduct of bisphenol A with 2 mol
   ethylene oxide (5 mol %)
(B) N,N'-Ethylenebiscaprylic acid amide 5% by weight
(C) Acryl copolymer (number average molecular weight: 248,000) 20% by weight
Composition:
   Methyl acrylate (65 mol %)
   Ethyl acrylate (28 mol %)
   2-Hydroxyethyl methacrylate (2 mol %)
   N-Methylolmethacrylamide (5 mol %)
(D) Acrylic resin fine particles (average particle diameter 0.03 μm) 10% by weight
(E) Polyoxyethylene nonylphenyl ether 5% by weight Comparative Example 10

A biaxially oriented film having a thickness of 100 μm and a light-diffusing plate were obtained in the same manner as in Example 6 except that the following coating agent R was used. Table 2 shows properties thereof. Self-blocking of the film was liable to take place, and its workability was unsatisfactory.

Coating Agent R:
(A) Water-base polyester resin (Tg=30° C.) 60% by weight
Acid components:
   Terephthalic acid (70 mol %)
   Isophthalic acid (28 mol %)
   Sodium 5-sulfoisophthalate (2 mol %)
Glycol components:
   Ethylene glycol (70 mol %)
   Adduct of bisphenol A with 2 mol ethylene oxide (30 mol %)
(B) N,N'-Ethylenebiscaprylic acid amide 5% by weight
(C) Acryl copolymer (number average molecular weight: 248,000) 20% by weight
Composition:
   Methyl acrylate (65 mol %)
   Ethyl acrylate (28 mol %)
   2-Hydroxyethyl methacrylate (2 mol %)
   N-Methylolmethacrylamide (5 mol %)
(D) Acrylic resin fine particles (average particle diameter 0.03 μm) 10% by weight
(E) Polyoxyethylene nonylphenyl ether 5% by weight Comparative Example 11

A biaxially oriented film was obtained in the same manner as in Example 6 except that the film thickness was changed to 250 μm and that an unstretched film was stretched 3.2 times as large in the longitudinal direction and 3.3 times as large in the transverse direction. Since the resultant film had too strong a nerve and had not only poor proccessability into a light-diffusing plate but also a high haze value, it was unsuitable for a light-diffusing plate.

TABLE 2

| | | Ex. 6 | Ex. 7 | Ex. 8 | Ex. 9 |
|---|---|---|---|---|---|
| Type of polyester of film | | PET | PET | PET | PET/IA3 |
| Amount of Sb in film mmol % | | 0 | 0 | 10 | 0 |
| Film thickness μm | | 100 | 100 | 100 | 100 |
| Coating thickness μm | | 0.10 | 0.14 | 0.10 | 0.08 |
| Type of coating | | P | P | P | P |
| Tg of water-base polyester of coating (° C.) | | 68 | 68 | 68 | 68 |
| Film properties | Haze % | 0.7 | 0.8 | 1 | 0.7 |
| | Total light transmissivity | 94 | 94 | 92 | 91 |
| | Property of easy adhesion to acryl adhesive | ◯ | ◯ | ◯ | ◯ |
| | Anti-blocking property | ◯ | ◯ | ◯ | ◯ |
| Evaluation for light-diffusing plate | Brilliance cd/m$^2$ | ◯ | ◯ | ◯ | ◯ |
| | Processability | ◯ | ◯ | ◯ | ◯ |
| General evaluation | | ◯ | ◯ | ◯ | ◯ |

TABLE 2-continued

|  |  | C. Ex. 6 | C. Ex. 7 | C. Ex. 8 | C. Ex. 9 | C. Ex. 10 | C. Ex. 11 |
|---|---|---|---|---|---|---|---|
| Type of polyester of film | | PET | PET | PET/IA3 | PET | PET | PET |
| Amount of Sb in film mmol % | | 0 | 20 | 10 | 0 | 0 | 0 |
| Film thickness μm | | 100 | 100 | 100 | 25 | 100 | 250 |
| Coating thickness μm | | — | 0.02 | 0.12 | 0.12 | 0.10 | 0.12 |
| Type of coating | | — | P | P | Q | R | P |
| Tg of water-base polyester of coating (° C.) | | — | 68 | 68 | 90 | 30 | 68 |
| Film properties | Haze % | 0.6 | 1.2 | 0.9 | 0.3 | 0.7 | 2.3 |
| | Total light transmissivity % | 86 | 87 | 89 | 91 | 90 | 89 |
| | Property of easy adhesion to acryl adhesive | X | X | ○ | X | ○ | X |
| | Anti-blocking property | ○ | ○ | ○ | ○ | X | ○ |
| Evaluation for light- | Brilliance cd/m$^2$ | — | ○ | — | — | ○ | — |
| diffusing plate | Processability | X | ○ | X | Δ | Δ | X |
| General evaluation | | X | X | X | X | X | X |

Ex.: Example
C. Ex.: Comparative Example
PET: Polyethylene terephthalate
PET/IAn: n-mol % isophthalic acid/polyethylene terephthalate copolymer Example 10

A reactor was charged with 96 parts of dimethyl terephthalate, 58 parts of ethylene glycol and 0.03 part of manganese acetate, respectively, and an ester interchange reaction was carried out with stirring while distilling out methanol until an internal temperature reached 240° C. After completion of the ester interchange reaction, 0.097 part of trimethyl phosphate was added. Then, 0.03 part of amorphous germanium oxide was added, and a reaction product was temperature-increased and ethylene glycol is distilled out, to finally carry out polycondensation under conditions of high vacuum and 280° C., whereby polyester chips having an intrinsic viscosity [η] of 0.62 were obtained.

Then, 0.4% by weight of porous silica having an average particle diameter of 1.7 μm (pore volume 1.2 ml/g) was added to part of the above polyester chips, and the mixture was dried at 170° C. for 3 hours, then fed to a twin-screw extruder, melt-kneaded at 280° C. and rapidly cooled to solidness to give master chips. The polyester chips and the above master chips were blended such that the concentration of the porous silica in the polymer was 0.007% by weight, and the blend was dried at 160° C. for 3 hours. The thus-dried blend was to be used for (Y) layer.

Separately, 56% of recycled polyester chips whose porous silica concentration in the polymer was 0.0014% and which had an intrinsic viscosity [η] of 0.55 and 44% of the above fresh polyester chips having an intrinsic viscosity [η] of 0.62 were blended, and the blend was dried at 160° C. for 3 hours. The thus-dried blend was to be used for (X) layer (intrinsic viscosity: 0.58).

The above chip blends were fed to different extruders and melt-extruded at 295° C. through a two-layered die such that a laminate had an (X):(Y) thickness ratio of 19:1 and that (X) layer came into contact with a cooling drum, and the laminate was rapidly cooled to solidness on the cooling drum maintained at 20° C., to give an unstretched film. The above unstretched film was stretched 3.5 times as large in the longitudinal direction at 95° C. in a state the (Y) layer was in contact with a stretching roller. Then, the above coating agent P was applied onto the lower surface and further onto the upper surface such that each coating was to have a thickness of 0.1 μm after dried, and the film was stretched 3.8 times as large in the transverse direction at 110° C. and then heat-treated at 230° C. to give a biaxially oriented film having a thickness of 100 μm (95 μm thick (X) layer and 5 μm thick (Y) layer). Table 3 shows properties of the obtained film.

The obtained biaxially oriented film was cut into a 215×290 mm film, and semi-spherical acryl beads having a diameter of 20 μm and a height of 10 μm were bonded to the entire reverse surface thereof (on the light-guiding plate side) at a projection/projection pitch of approximately 30 μm. Semi-spherical acryl beads having the above dimensions were also bonded to the entire front surface at a projection/projection pitch of approximately 21 μm. The thus-prepared film was used as a light-diffusing plate, to prepare a test diffusing plate having a structure in which the liquid crystal panel and the lens sheet shown in FIG. 1 were removed, and the test diffusing plate was measured for a brilliance and a brilliance non-uniformity on the front surface thereof. Table 3 shows the results.

Examples 11 to 13

Biaxially oriented films having a thickness of 100 μm were obtained in the same manner as in Example 10 except that the lubricant, the layer constitution and the coating thickness were changed as shown in Table 3. Table 3 shows properties of these films. These films were used to prepare light-diffusing plates similar to the light-diffusing plate in Example 10, and the light-diffusing plates were evaluated. Table 3 shows the results.

Examples 14 to 17

Examples 10 to 13 were repeated except that the coating agent was replaced by the following.

Coating Agent E

Terephthalic acid-isophthalic acid-5-Na sulfoisophthalate (compound of the above chemical formula (1): accounting for 13 mol % based on the total of dicarboxylic acid components)-ethylene glycol-neopentyl glycol copolyester resin P (Tg=49° C.) . . . 56 parts by weight Methyl methacrylate-ethyl acrylate-acrylic acid-methacrylamide-N-methylolacrylamide copolymer S (Tg=42° C.) . . . 25 parts by weight Crosslinked acrylic resin filler (having a diameter of 40 nm) . . . 10 parts by weight Ethylene oxide-propylene oxide copolymer . . . 9 parts by weight Solid Concentration 4%

Comparative Example 12

A biaxially oriented film having a thickness of 100 μm was obtained in the same manner as in Example 10 except that the easy-adhesion coating was not formed. Table 4 shows properties of the film. The film had low capability of adhesion to acryl beads, so that it was not processable into a light-diffusing plate.

Comparative Example 13

The coating agent P was applied to both the surfaces of single-layered and 100 μm thick biaxially oriented film of a generally available, to obtain a film and a light-diffusing plate. Table 4 shows properties thereof. The film had low light transmissivity, and the light-diffusing plate had low brilliance, so that the film was not suitable for a light-diffusing plate.

Comparative Example 14

A 100 μm thick biaxially oriented film and a light-diffusing plate were obtained in the same manner as in Example 10 except that the coating agent was replaced with the above coating agent Q. Table 4 shows properties thereof. The film had low capability of adhesion to an acryl and was not suitable for a light-diffusing plate.

Comparative Example 15

A 100 μm thick biaxially oriented film was obtained in the same manner as in Example 11 except that the coating agent was replaced with the above coating agent R. Table 4 shows properties thereof. The film tended to cause blocking and was not smoothly processable into a light-diffusing plate.

Comparative Example 16

A 100 μm thick biaxially oriented film was obtained in the same manner as in Example 11 except that the layer structure was changed as shown in Table 4. Table 4 shows properties thereof. The film had a large haze and had deficient brilliance, so that it was not suitable for a light-diffusing plate. Further, the film had a high concentration of a lubricant from a recycled product, and the film was poor in recycling properties.

Comparative Example 17

A 100 μm thick biaxially oriented film and a light-diffusing plate were obtained in the same manner as in Example 10 except that the thickness of the coating formed of the coating agent P was changed to 0.2 μm. Table 4 shows properties thereof. Self-blocking of the film was liable to take place, and its workability was unsatisfactory.

Comparative Example 18

A 100 μm thick biaxially oriented film and a light-diffusing plate were obtained in the same manner as in Example 10 except that the coating agent was replaced with the coating agent E and that the coating thickness was changed to 0.4 μm. Table 4 shows properties thereof. Self-blocking of the film was liable to take place, and its workability was unsatisfactory.

Comparative Example 19

A biaxially oriented film was obtained in the same manner as in Example 10 except that the film thickness was changed to 250 μm, that the layer constitution was changed as shown in Table 4 and that an unstretched film was stretched 3.2 times as large in the machine direction and 3.3 times as large in the transverse direction. Since the resultant film had too strong a nerve and had not only poor proccessability into a light-diffusing plate but also a high haze value, it was unsuitable for a light-diffusing plate.

TABLE 3

| | Ex. 10 | Ex. 11 | Ex. 12 | Ex. 13 | Ex. 14 | Ex. 15 | Ex. 16 | Ex. 17 |
|---|---|---|---|---|---|---|---|---|
| Type of polyester of film | PET | PET | PET | PET | PET | PET | PET | PET |
| Film thickness μm | 100 | 100 | 100 | 100 | 100 | 100 | 100 | 100 |
| Layer constitution | X/Y | Y/X/Y | X/Y | Y/X/Y | X/Y | Y/X/Y | X/Y | Y/X/Y |
| Thickness of each layer μm | 95/5 | 5/90/5 | 95/5 | 5/90/5 | 97/3 | 3/94/3 | 97/3 | 3/97/3 |
| Type of lubricant | Porous silica | Porous silica | Aluminum silicate | Aluminum silicate | Porous silica | Porous silica | Aluminum silicate | Aluminun silicate |
| Average particle diameter of lubricant μm | 1.7 | 1.7 | 0.9 | 0.9 | 1.7 | 1.7 | 0.9 | 0.9 |
| Concentration of lubricant in A layer, wt % | 0.0008 | 0.0008 | 0.0004 | 0.0008 | 0.0008 | 0.0008 | 0.0004 | 0.0004 |
| Concentration of lubricant in B layer, wt % | 0.007 | 0.007 | 0.004 | 0.004 | 0.007 | 0.007 | 0.004 | 0.004 |
| Coating thickness μm | 0.10 | 0.14 | 0.08 | 0.12 | 0.06 | 0.08 | 0.06 | 0.08 |
| Type of coating | P | P | P | P | E | E | E | E |
| Tg of water-base polyester of coating (° C.) | 68 | 68 | 68 | 68 | 49 | 49 | 49 | 49 |
| Film properties Haze % | 0.61 | 0.63 | 0.62 | 0.67 | 0.57 | 0.59 | 0.58 | 0.61 |
| Total light transmissivity % | 94 | 94 | 92 | 93 | 91 | 92 | 91 | 92 |
| Property of easy adhesion to acryl adhesive | ○ | ○ | ○ | ○ | ○ | ○ | ○ | ○ |
| Anti-blocking property | ⊙ | ⊙ | ⊙ | ⊙ | ○ | ○ | ○ | ○ |
| Evaluation for light-diffusing plate Brilliance | ○ | ○ | ○ | ○ | ○ | ○ | ○ | ○ |
| Processability | ○ | ○ | ○ | ○ | ○ | ○ | ○ | ○ |
| General evaluation | ○ | ○ | ○ | ○ | ○ | ○ | ○ | ○ |

Ex.: Example
PET: Polyethylene terephthalate

TABLE 4

| | C. Ex. 12 | C. Ex. 13 | C. Ex. 14 | C. Ex. 15 | C. Ex. 16 | C. Ex. 17 | C. Ex. 18 | C. Ex. 19 |
|---|---|---|---|---|---|---|---|---|
| Type of polyester of film | PET | PET | PET | PET | PET | PET | PET | PET |
| Film thickness μm | 100 | 100 | 100 | 100 | 100 | 100 | TA 100 | 250 |
| Layer constitution | X/Y | X | X/Y | Y/X/Y | Y/X/Y | X/Y | X/Y | Y/X/Y |

TABLE 4-continued

| | C. Ex. 12 | C. Ex. 13 | C. Ex. 14 | C. Ex. 15 | C. Ex. 16 | C. Ex. 17 | C. Ex. 18 | C. Ex. 19 |
|---|---|---|---|---|---|---|---|---|
| Thickness of each layer μm | 95/5 | 100 | 95/5 | 5/95/5 | 30/40/30 | 95/5 | 95/5 | 20/210/20 |
| Type of lubricant | Porous silica | Aluminum silicate | Porous silica | Porous silica | Porous silica | Porous silica | Porous silica | Porous silica |
| Average particle diameter of lubricant μm | 1.7 | 0.9 | 1.7 | 1.7 | 1.7 | 1.7 | 1.7 | 1.7 |
| Concentration of lubricant in A layer, wt % | 0.0008 | 0.08 | 0.0008 | 0.0008 | 0.0008 | 0.0008 | 0.0008 | 0.0008 |
| Concentration of lubricant in B layer, wt % | 0.007 | — | 0.007 | 0.004 | 0.055 | 0.007 | 0.007 | 0.007 |
| Coating thickness μm | — | 0.10 | 0.10 | 0.10 | 0.01 | 0.20 | 0.40 | 0.1 |
| Type of coating | — | P | Q | R | P | P | E | P |
| Tg of water-base polyester of coating (° C.) | — | 68 | 90 | 30 | 68 | 68 | 49 | 68 |
| Film properties Haze % | 0.6 | 7.32 | 1.41 | 3.13 | 7.11 | 1.11 | 1.47 | 4.02 |
| Total light transmissivity % | 88 | 75 | 90 | 79 | 80 | 93 | 89 | 87 |
| Property of easy adhesion to acryl adhesive | X | ○ | Δ | ○ | ○ | ○ | ○ | ○ |
| Anti-blocking property | ⊚ | ⊚ | ○ | X | ○ | Δ | X | ○ |
| Evaluation for light- Brilliance | — | X | ○ | ○ | X | ○ | ○ | Δ |
| diffusing plate Processability | — | ○ | ○ | X | ○ | ○ | ○ | X |
| General evaluation | X | X | X | X | X | X | X | X |

C.Ex.: Comparative Example
PET: Polyethylene terephthalate

What is claimed is:

1. A polyester film composite material comprising a biaxially oriented polyester film having a thickness of at least 50 μm but not more than 200 μm and an easy-adhesion coating applied onto one or each surface thereof, and having a haze value of less than 2% and a total light transmissivity of at least 90%, wherein the biaxially oriented polyester film is a single-layered polyester film or a laminated polyester film, and a polyester constituting a single layer or at least an outer film of a laminated film in said biaxially oriented polyester film contains at least 0.001% by weight but not more than 0.1% by weight of porous silica particles and/or plate-like aluminum silicate particles having an average particle diameter of at least 0.1 μm but not greater than 3 μm, and said easy-adhesion coating has a composition composed, substantially of (A) a water-base polyester resin having a glass transition point of 40 to 80° C., (B) an acrylic resin having a glass transition point of 25 to 75° C. and (C) acrylic crosslinked polymer particles.

2. The polyester film composite material of claim 1, wherein a polyester constituting said biaxially oriented polyester film is polyethylene terephthalate.

3. The polyester film composite material of claim 1, wherein a polyester constituting said biaxially oriented polyester film is polyethylene-2,6-naphthalate.

4. The polyester film composite material of claim 1, wherein the easy-adhesion coating is formed on each surface of said biaxially oriented polyester film.

5. The polyester film composite material of claim 1, which has a haze value of less than 1.5%.

6. The polyester film composite material of claim 1, which has a total light transmissivity of at least 93%.

7. The polyester film composite material of claim 1, wherein the biaxially oriented polyester film is a single-layered polyester film or a laminated polyester film formed of two layers or three layers.

8. The polyester film composite material of claim 1, wherein said biaxially oriented polyester film is a laminated polyester film of two or three layers, and a polyester layer (Y) containing at least 0.001% by weight but not more than 0.1% by weight of porous silica particles and/or plate-like aluminum silicate particles having an average particle diameter of at least 0.1 μm but not greater than 3 μm is laminated on one surface or each surface of a polyester film layer (X) containing 0.005% by weight or less of inert fine particles.

9. The polyester film composite material of claim 8, wherein a polyester constituting the polyester film layer (X) has an intrinsic viscosity ($\eta_x$) of 0.40 to 0.6. a polyester constituting the polyester film layer (Y) has an intrinsic viscosity ($\eta_y$) of 0.50 to 0.65 and ($\eta_y$) is equivalent to, or greater than, ($\eta_x$).

10. The polyester film composite material of claim 1, wherein said easy-adhesion coating has a thickness of 0.06 to 0.16 μm.

11. The polyester film composite material of claim 1, wherein said easy-adhesion coating further comprises (D) an aliphatic amide and/or an aliphatic bisamide.

12. The polyester film composite material of claim 1 or 11, wherein said (C) acrylic crosslinked polymer particles have an average particle diameter of at least 0.01 μm but not greater than 0.30 μm.

13. The polyester film composite material of claim 1 or 11, wherein said (A) water-base polyester resin contains 8 to 20 mol %, based on the content of total dicarboxylic acid components, of a dicarboxylic acid component having a molecule containing a group of —$SO_3M$ in which M is a metal atom, an ammonium group or a quatemary phosphonium group.

14. The polyester film composite material of claim 1, which gives a brilliance of at least 200 cd/m² when a light-diffusing layer is laminated on a surface of the easy-adhesion coating.

15. The polyester film composite material of claim 1, wherein the amount of an antimony compound contained in a polyester constituting the biaxially oriented polyester film is 15 mmol % or less as metal antimony per mole of total acid components of the polyester.

16. A polyester film composite material comprising
    (I) a biaxially oriented polyester film formed of polyethylene terephthalate containing at least 0.001% by weight but not more than 0.1% by weight of porous silica particles and/or plate-like aluminum silicate particles having an average particle diameter of at least 0.1 μm but not greater than 3 μm, and
    (II) a coating composition substantially containing (A') a water-base polyester containing 8 to 20 mol %, based on the content of total dicarboxylic acid components, of a dicarboxylic acid component having a group of —SO₃M (in which M is a metal atom, ammonium salt or quaternary phosphonium salt) in its molecule and having a glass transition point of 40 to 80° C., (B) an acrylic resin having a glass transition point of 25 to 75° C. and (C) acrylic crosslinked polymer particles.

(III) the biaxially oriented polyester film having a structure in which a coating of said coating composition is formed on both the surfaces of said biaxially oriented polyester and having a haze value of less than 2% and a total light transmissivity of at least 90%.

17. A polyester film composite material comprising (I) a biaxially oriented polyester film formed of polyethylene terephthalate containing at least 0.001% by weight but not more than 0.1% by weight of porous silica particles and/or plate-like aluminum silicate particles having an average particle diameter of at least 0.1 pm but not greater than 3 μm, and (II) a coating composition substantially containing (A') a water-base polyester containing 8 to 20 mol %, based on the content of total dicarboxylic acid components, of a dicarboxylic acid component having a group of —SO₃M (in which M is a metal atom, ammonium salt or quaternary phosphonium salt) in its molecule and having a glass transition point of 40 to 80° C., (B) an acrylic resin having a glass transition point of 25 to 75° C., (C) acrylic crosslinked polymer particles and (D) an aliphatic amide and/or aliphatic bisamide, (III) the biaxially oriented polyester film having a structure in which a coating of said coating composition is formed on both the surfaces of said biaxially oriented polyester and having a haze value of less than 2% and a total light transmissivity of at least 90%.

18. A polyester film composite material comprising (I) a polyester film that is a laminated biaxially oriented polyester film formed of laminated two or three laminated layers formed of polyethylene terephthalate, said film being a film wherein a polyester layer (Y) containing at least 0.001% by weight but not more than 0.1% by weight of porous silica particles and/or plate-like aluminum silicate particles having an average particle diameter of at least 0.1 μm but not greater than 3 μm is laminated on each surface or one surface of a polyester film layer (X) having an inert-fine-particles content of 0.005% by weight or less, and (II) a coating composition substantially containing (A') a water-base polyester containing 8 to 20 mol %, based on the content of total dicarboxylic acid components, of a dicarboxylic acid component having a group of —SO₃M (in which M is a metal atom, ammoniuni salt or quatemary phosphonium salt) in its molecule and having a glass transition point of 40 to 80° C., (B) an acrylic resin having a glass transition point of 25 to 75° C., and (C) acrylic crosslinked polymer particles, (III) the biaxially oriented polyester film having a structure in which a coating of said coating composition is formed on both the surfaces of said biaxially oriented polyester and having a haze value of less than 2% and a total light transmissivity of at least 90%.

19. The polyester film composite material of claim 18, wherein the coating composition further contains (D) an aliphatic amide and/or aliphatic bisamide.

20. A light-diffusing plate comprising the polyester film composite material recited in claim 1 and a light-diffusing layer laminated on the surface of the easy-adhesion coating thereof.

21. A liquid crystal display comprising the light-diffusing plate recited in claim 20 arranged therein.

22. A composite glass comprising the polyester film composite material recited in claim 1 laminated on a glass plate.

* * * * *